(12) United States Patent
Iwadate

(10) Patent No.: US 8,809,664 B2
(45) Date of Patent: Aug. 19, 2014

(54) SUPPORT FUNCTION RECOMMENDING APPARATUS, A SUPPORT FUNCTION RECOMMENDING METHOD, A SUPPORT FUNCTION RECOMMENDING SYSTEM, AND A RECORDING MEDIUM

(75) Inventor: Akihito Iwadate, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 157 days.

(21) Appl. No.: 13/608,924

(22) Filed: Sep. 10, 2012

(65) Prior Publication Data

US 2013/0074678 A1 Mar. 28, 2013

(30) Foreign Application Priority Data

Sep. 26, 2011 (JP) ................................. 2011-208682

(51) Int. Cl.
*A63H 5/00* (2006.01)
*G09B 7/02* (2006.01)
*G09B 5/06* (2006.01)

(52) U.S. Cl.
CPC .. *G09B 7/02* (2013.01); *G09B 5/06* (2013.01); *G10H 2210/091* (2013.01); *G10H 2240/141* (2013.01)
USPC .......................................................... 84/609

(58) Field of Classification Search
CPC ...... G09B 7/02; G09B 5/06; G10H 2210/091; G10H 2240/141
USPC .......................................................... 84/609
See application file for complete search history.

(56) References Cited

U.S. PATENT DOCUMENTS

| 6,120,300 | A | * | 9/2000 | Ho et al. | 434/332 |
| 8,639,177 | B2 | * | 1/2014 | Hines et al. | 434/350 |
| 2003/0129576 | A1 | * | 7/2003 | Wood et al. | 434/362 |
| 2006/0127871 | A1 | * | 6/2006 | Grayson | 434/350 |
| 2008/0131863 | A1 | * | 6/2008 | Stuppy | 434/362 |
| 2009/0047648 | A1 | | 2/2009 | Ferreira | |
| 2009/0186329 | A1 | * | 7/2009 | Connor | 434/350 |

FOREIGN PATENT DOCUMENTS

JP 08-297487 A 11/1996
JP 9-237088 A 9/1997

(Continued)

OTHER PUBLICATIONS

Japanese Office Action dated Aug. 13, 2013 (and English translation thereof) in counterpart Japanese Application No. 2011-208682.

*Primary Examiner* — Jianchun Qin
(74) *Attorney, Agent, or Firm* — Holtz Holtz Goodman & Chick PC

(57) ABSTRACT

Plural electronic musical instruments 2 obtain proficiency level related information, that includes items such as usage amounts of plural support functions which are used by a user in performing a playing practice of a practice piece during a period from a previous practice to the last practice and a proficiency level of a playing technique of a practice piece, and supply the information to a server 1. The server stores the received proficiency level related information in a database 14. Upon receipt of the information, a controlling unit 12 of the server 1 sends back the electronic musical instrument 2 information indicating the support function most suitable for practicing the practice piece determined on the basis of the received information and a series of information stored in the database containing the proficiency level related information including the item of the proficiency level corresponding to an aimed level.

7 Claims, 8 Drawing Sheets

(56) References Cited

FOREIGN PATENT DOCUMENTS

| JP | 2003-131549 A | 5/2003 |
| JP | 2004-184757 A | 7/2004 |
| JP | 2004-272130 A | 9/2004 |
| JP | 2006-195021 A | 7/2006 |
| JP | 2010-164629 A | 7/2010 |
| JP | 2010-537232 A | 12/2010 |

* cited by examiner

FIG. 4

| USER ID | PIECE ID | FUNCTION 1 | FUNCTION 2 | FUNCTION 3 | FUNCTION 4 | PROFICIENCY LEVEL | DATE & TIME |
|---|---|---|---|---|---|---|---|
| ╲ | | | | | | | |
| uid1 | sid1 | f1v1101 | f2v1101 | f3v1101 | f4v1101 | sk1101 | dt1101 |
| * uid1 | sid1 | f1v1102 | f2v1102 | f3v1102 | f4v1102 | sk1102 | dt1102 |
| uid1 | sid1 | f1v1103 | f2v1103 | f3v1103 | f4v1103 | sk1103 | dt1103 |
| uid1 | sid1 | f1v1104 | f2v1104 | f3v1104 | f4v1104 | sk1104 | dt1104 |
| uid1 | sid1 | f1v1105 | f2v1105 | f3v1105 | f4v1105 | sk1105 | dt1105 |
| uid1 | sid1 | f1v1106 | f2v1106 | f3v1106 | f4v1106 | sk1106 | dt1106 |
| uid1 | sid1 | f1v1107 | f2v1107 | f3v1107 | f4v1107 | sk1107 | dt1107 |
| uid1 | sid1 | f1v1108 | f2v1108 | f3v1108 | f4v1108 | sk1108 | dt1108 |
| ╲ | | | | | | | |
| uid1 | sid2 | f1v1201 | f2v1201 | f3v1201 | f4v1201 | sk1201 | dt1201 |
| uid1 | sid2 | f1v1202 | f2v1202 | f3v1202 | f4v1202 | sk1202 | dt1202 |
| uid1 | sid2 | f1v1203 | f2v1203 | f3v1203 | f4v1203 | sk1203 | dt1203 |
| uid1 | sid2 | f1v1204 | f2v1204 | f3v1204 | f4v1204 | sk1204 | dt1204 |
| uid1 | sid2 | f1v1205 | f2v1205 | f3v1205 | f4v1205 | sk1205 | dt1205 |
| ╲ | | | | | | | |
| uid2 | sid1 | f1v2101 | f2v2101 | f3v2101 | f4v2101 | sk2101 | dt2101 |
| uid2 | sid1 | f1v2102 | f2v2102 | f3v2102 | f4v2102 | sk2102 | dt2102 |
| uid2 | sid1 | f1v2103 | f2v2103 | f3v2103 | f4v2103 | sk2103 | dt2103 |
| * uid2 | sid1 | f1v2104 | f2v2104 | f3v2104 | f4v2104 | sk2104 | dt2104 |
| uid2 | sid1 | f1v2105 | f2v2105 | f3v2105 | f4v2105 | sk2105 | dt2105 |
| uid2 | sid1 | f1v2106 | f2v2106 | f3v2106 | f4v2106 | sk2106 | dt2106 |
| uid2 | sid1 | f1v2107 | f2v2107 | f3v2107 | f4v2107 | sk2107 | dt2107 |
| ╲ | | | | | | | |
| uid9 | sid1 | f1v9101 | f2v9101 | f3v9101 | f4v9101 | sk9101 | dt9101 |
| uid9 | sid1 | f1v9102 | f2v9102 | f3v9102 | f4v9102 | sk9102 | dt9102 |
| * uid9 | sid1 | f1v9103 | f2v9103 | f3v9103 | f4v9103 | sk9103 | dt9103 |
| ╲ | | | | | | | |

SUPPORT FUNCTION RECOMMENDING APPARATUS, A SUPPORT FUNCTION RECOMMENDING METHOD, A SUPPORT FUNCTION RECOMMENDING SYSTEM, AND A RECORDING MEDIUM

CROSS-REFERENCE TO RELATED APPLICATION

The present application is based upon and claims the benefit of priority from the prior Japanese Patent Application No. 2011-208682, filed Sep. 26, 2011, the entire contents of which are incorporated herein by reference.

BACKGROUND OF THE INVENTION

1. Field of the Invention

The present invention relates to a technology, which is mounted on an electronic musical instrument provided with plural support functions for assisting a user in acquiring a playing technique and gives the user information of the support function suitable for acquiring a playing technique of a practice piece prepared in advance.

2. Description of the Related Art

Electronic pianos (including electronic keyboards), one of conventional electronic musical instruments, have been put in practical use, which are provided with a support function for assisting a user in acquiring a playing technique of a practice piece prepared in advance. An example of the support function is disclosed in Unexamined Japanese Patent Publication No. Hei9-237088. When the user practices the practice piece prepared in advance on the instrument, the support function serves to successively turn on LEDs (Light Emitting Diodes) indicating keys to be played and/or to enlarge a musical score, as the practice piece advances, and/or to slow down the tempo of an accompaniment.

Further, Unexamined Japanese Patent Publication No. 2004-184757 discloses a technology, which obtains performance data representing user's performance made when the user plays a practice piece on the electronic piano, and compares the obtained performance data with data as for example of performance of the practice piece, thereby obtaining a proficiency-level of the playing technique to visually indicate the user of a temporal change in playing technique.

In the case that the support functions are provided on the electronic pianos, etc., it is preferable to prepare plural sorts of support functions so as to satisfy various likes and tastes of the user. But when the plural sorts of support functions are provided on the electronic pianos, etc., the following problem is invited.

Using the technology disclosed in Unexamined Japanese Patent Publication No. 2004-184757, the user can learn the temporal change in playing technique until now, but when the user practices an arbitrary practice piece, he or she could not determine which support function is better for him or her to improve his or her playing technique effectively, before actually using various support functions.

The present invention has been made to solve the problem involved in the conventional technique, and provides a support function recommending apparatus, a support function recommending method, a support function recommending system, and a recording medium, mounted on an electronic musical instrument, which is provided with plural support functions for assisting a user in acquiring a playing technique, and giving the user information of the support function suitable for acquiring a playing technique of a practice piece prepared in advance.

SUMMARY OF THE INVENTION

According to one aspect of the invention, there is provided a support function recommending apparatus, which comprises a memory for storing plural pieces of proficiency level related information, the proficiency level related information including items such as usage amounts of plural support functions which are used by each of a number of users in performing a playing practice of a practice piece during a period from a previous practice to the last practice and a proficiency level of a playing technique of the practice piece, a searching unit for searching for a series of proficiency level related information of other users other than an identical user, which include the item of a proficiency level falling in a range from a first proficiency level to a second proficiency level, through the plural pieces of proficiency level related information stored in the memory, wherein the first proficiency level corresponds to a proficiency level of the identical user and the second proficiency level corresponds to an aimed level of the practice by the identical user in the proficiency level related information, a judging unit for determining an effectiveness of each of the plural support functions on the basis of the series of proficiency level related information found by the searching unit, and a function recommending unit for providing the identical user with function recommending information indicating the support function which is determined by the judging unit to be most effective and suitable for performing the playing practice of the practice piece.

BRIEF DESCRIPTION OF THE DRAWINGS

FIG. 4 is a conceptual view showing an example of data (proficiency-level related information) stored in proficiency-level information database.

DETAILED DESCRIPTION OF THE PREFERRED EMBODIMENTS

Figure 1:
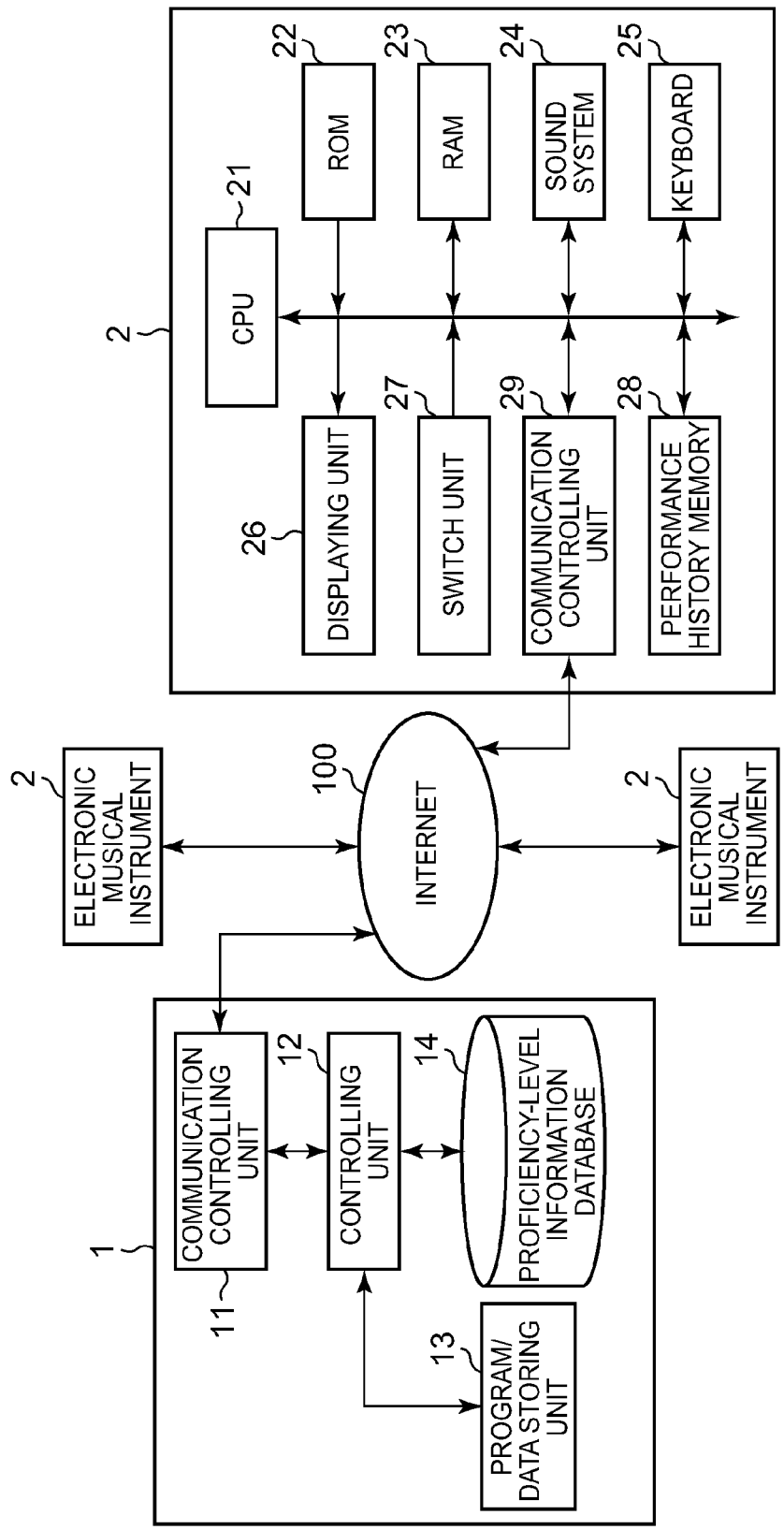
FIG. 1 is a view showing a configuration of a support-function recommending system according to the present invention.

Now, one preferred embodiment of the present invention will be described. FIG. 1 is a view showing a configuration of a support-function recommending system according to the present invention. The present support-function recommending system comprises a function recommending server 1 and a number of electronic musical instruments 2, 2, 2, . . . , which can be connected to each other through the internet 100.

In the present embodiment of the invention, a keyboard instrument such as an electronic piano, an electronic keyboard, etc. is used as each of the electronic musical instruments 2. Further, each electronic musical instrument 2 is provided with plural sorts of support functions for assisting a user in acquiring playing technique when the user practices a practice piece prepared in advance. Similarly to the functions of the electronic musical instruments as described above (in Description of the Related Art), for instance, the support functions of the electronic musical instrument 2 include a function of successively turning on LEDs to sequentially indicate keys to be operated as a musical performance advances, a function of enlarging a musical score to display and a function of slowing down the tempo of an accompaniment. In addition, each electronic musical instrument 2 has a function of obtaining and advising the user of his or her proficiency level in playing technique of an arbitrary practice piece when the user has played the arbitrary practice piece.

Meanwhile, in response to a request from the electronic musical instrument 2, the function recommending server 1 provides the electronic musical instrument 2 with function recommending information indicating a support function suitable for acquiring the playing technique when the user practices his or her desired practice piece. The function recommending information supplied to the electronic musical instrument 2 is information indicating the recommendation order to the respective support functions based on expected effectiveness in acquiring the playing technique.

The support-function recommending system according to the invention will be described with reference to the accompanying drawings in detail.

[Electronic Musical Instruments]

As shown in FIG. 1, the electronic musical instrument 2 comprises CPU (Central Processing Unit) 21, ROM (Read Only Memory) 22, RAM (Random Access Memory) 23, a sound system 24, a keyboard 25 to be operated, a displaying unit 26, a switch unit 27, a performance history memory 28, and a communication controlling unit 29. CPU 21 controls the whole operation of the musical instrument 2, and includes a built-in clock (not shown) having a calendar function for counting the current date and time.

ROM 22 stores plural sorts of programs for CPU 21 to control the whole operation of the musical instrument 2, and plural sorts of musical-piece information relating to plural practice pieces.

Figure 2A:
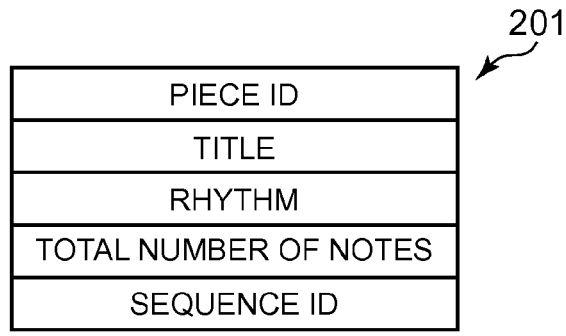
FIG. 2A is a conceptual view showing musical-piece information.
Figure 2B:
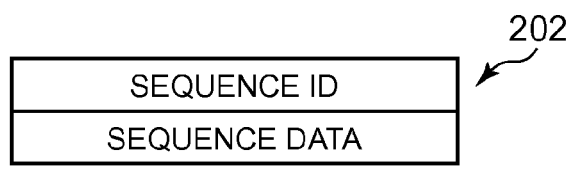
FIG. 2B is a conceptual view showing sequence information indicated by a sequence ID.

FIG. 2A is a conceptual view showing the musical-piece information 201. The musical-piece information 201 contains apiece ID for identifying a practice piece, a title, a rhythm, the total number of notes, and a sequence ID. The total number of notes indicates the total number of musical notes and rests involved in a practice piece. The sequence ID indicates the number identifying sequence data for performing the practice piece. FIG. 2B is a conceptual view showing sequence information 202 indicated by the sequence ID. The sequence information 202 contains the sequence ID indicating the number identifying sequence data of the practice piece and contents of the practice piece, that is, the sequence data representing a musical score of the practice piece.

RAM 23 is used as a work memory of CPU 21. Various sorts of data are stored in RAM 23 as needed.

The sound system 24 comprises a sound source unit for generating waveform data of sounds in response to operation performed by the user on the keyboard 25, D/A converter for converting the waveform data into an analog signal, an amplifier for amplifying the analog signal, and a speaker for outputting the analog signal as a sound.

The displaying unit 26 comprises LCD (Liquid Crystal Display, not shown) and plural LEDs arranged respectively to the keys of the keyboard 25.

The switch unit 27 comprises a power switch and plural switches used for setting various operational conditions of the electronic musical instrument 2 for the user to play the same instrument 2. The operational conditions of the electronic musical instrument 2 include setting a practice piece, setting whether or not a support function is used, and setting the sort of the support function to be used.

Figure 2C:
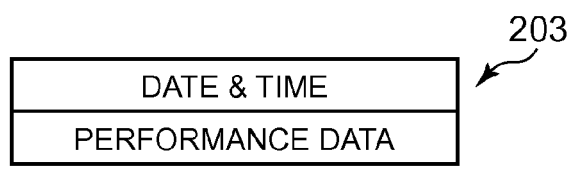
FIG. 2C is a conceptual view showing performance information.

The performance history memory 28 is composed of a non-volatile memory such as a flash memory, into which data can be re-writable as needed. The performance information, which represents contents of a performance given by the user is always stored in the performance history memory 28. FIG. 2C is a conceptual view showing the performance information 203. As shown in FIG. 2C, the performance information 203 contains a date and time and performance data representing contents of the performance given by the user. The date and time represents a time, year-month-day-time-minute-second, at which the performance data has been stored in the performance history memory 28. The performance data is composed of the same data as the sequence data stored in ROM 22.

Figure 2D:
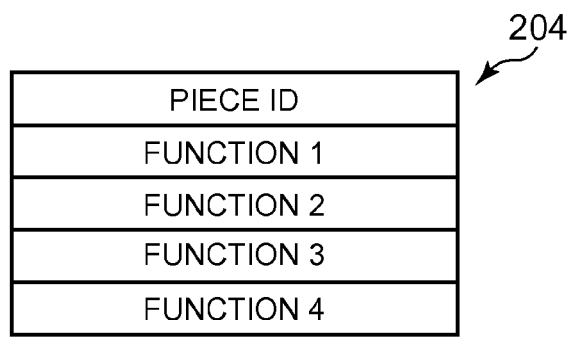
FIG. 2D is a conceptual view showing function-usage information of each practice piece.

The performance history memory 28 stores function-usage information of respective practice pieces, which information represents how the support function has been used by the user. FIG. 2D is a conceptual view showing the function-usage information 204 of each practice piece. As shown in FIG. 2D, the function-usage information 204 contains the piece ID for identifying a practice piece and usage amounts indicating used hours and/or the number of used times of the respective support functions, counted separately with respect to the respective support functions (functions 1, 2, 3 and 4 in FIG. 4).

The communication controlling unit 29 performs data communication with the function recommending server 1 under the command of CPU 21.

In the electronic musical instrument 2, CPU 21 runs the program stored in ROM 22 to perform the following process. In other words, CPU 21 renews the usage amount of the corresponding support function in the function-usage information 204 stored in the performance history memory 28 every time the user has practiced the practice piece with use of the support function.

When the user has played the practice piece with a mode set in the electronic musical instrument 2, in which mode the proficiency level of playing technique is obtained, CPU 21 newly stores the above described performance information 203 in the performance history memory 28 and obtains the user's proficiency level of playing technique of the practice piece.

The proficiency level indicates the playing technique of the user numerically, when the user has played a practice piece. More specifically, when the total number of musical notes and rests contained in the practice piece is expressed as the total number of notes, the proficiency level will be the total number of notes when the performance data coincides completely with the sequence data of the practice piece.

When obtaining the proficiency level, CPU 21 stores as needed in the performance history memory 28 performance data representing the contents of the performance given by the user while the user practices a practice piece, and compares the performance data with the sequence data of the practice piece to obtain the proficiency level of the user, when the user has finished performing the practice piece. More specifically, CPU 21 compares every note (musical note and rest) of the performance data with the sequence data of the practice piece to find a difference(s) between them. If a difference(s) in scale is found, an additional sound is found, or one sound is missing, then the number of "1" is deleted from the total number of notes in each case, and the final number of notes, that is, the number of notes which has been played correctly represents the proficiency level of the user.

The above described content and obtaining method of the proficiency level are just examples, and the content and obtaining method of the proficiency level are not limited to the above and arbitrary.

CPU 21 sends proficiency-level related information to the function recommending server 1 through the communication controlling unit 29, wherein the proficiency-level related information includes the obtained proficiency-level and the usage amounts of the respective support functions stored as function-usage information 204 in the performance history memory 28. After sending the proficiency-level related information, CPU 21 initializes the usage amounts of the respective support functions (functions 1 to 4) relating to the practice piece, on which the proficiency level has been obtained.

Figure 3:
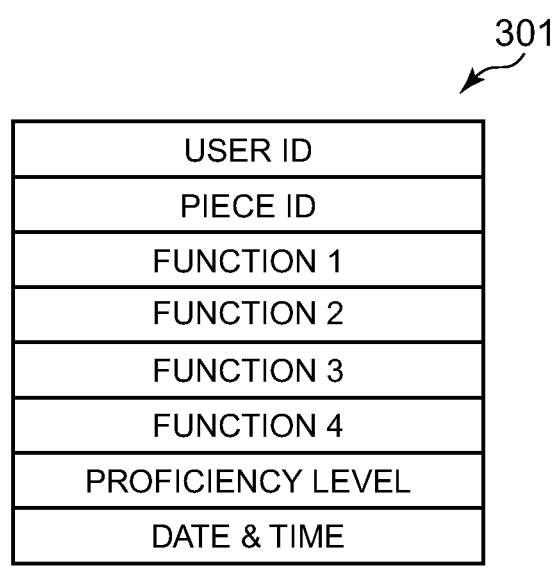
FIG. 3 is a conceptual view showing a configuration of proficiency-level related information sent from an electronic musical instrument to a function recommending server.

FIG. 3 is a conceptual view showing a configuration of the proficiency-level related information 301, which CPU 21 sends to the function recommending server 1. As shown in FIG. 3, the proficiency-level related information 301 is composed of the user ID, the piece ID, the usage amounts of the support function 1 to support function 4, the proficiency level, and the date and time.

The user ID is a user's number for identifying the user. In the following description, the user's number is a serial number beginning from "1", previously registered in the respective electronic musical instruments. The date and time is a time, year-month-day-time-minute-second, at which the proficiency-level related information 301 has been obtained, that is, at which the proficiency-level related information 301 sent to the function recommending server 1 has been registered.

Further, CPU 21 receives function recommending information sent from the function recommending server 1 and displays on LCD of the displaying unit 26 the recommendation order to the respective support functions indicated by the received function recommending information, wherein the function recommending information is sent from the function recommending server 1 in response to the received proficiency-level related information 301. The recommendation order displayed on LCD of the displaying unit 26 is used by the user to learn which support function is suitable for practicing the practice piece included in the proficiency-level related information 301, which the user has sent to the function recommending server 1. From the recommendation order displayed on the displaying unit 26, the user can learn which support function he or she should use to become good at playing the practice piece.

[Function Recommending Server]

As shown in FIG. 1, the function recommending server comprises a communication controlling unit 11, a controlling unit 12, a program/data storing unit 13, and a proficiency-level information database 14.

The communication controlling unit 11 exchanges data with the electronic musical instruments 2 through the internet 100.

The controlling unit 12 runs the program stored in the program/data storing unit 13 to control an operation of the communication controlling unit 11 and stores in the proficiency-level information database 14 the proficiency-level related information 301 sent from the electronic musical instruments 2. The controlling unit 12 comprises CPU, a peripheral circuit of CPU, and a work memory such as RAM (not shown).

FIG. 4 is a conceptual view showing an example of data (proficiency-level related information) stored in the proficiency-level information database 14. As described above, plural pieces of data (user ID, piece ID, function 1, function 2, function 3, function 4, a proficiency-level, and date and time) compose the proficiency-level related information and are stored as one record in the proficiency-level information database 14. Values given in each field shown in FIG. 4 are not real values but are data encoded for discrimination.

As shown in FIG. 4, the records are arranged in the order of the user ID, piece ID and Date and Time. In other words, in a group of the records having the user ID, "uid1" and the piece ID, "sid1", these records are arranged in ascending order of Date and Time, "dt1101", "dt1102", "dt1103", ..., "dt1108".

Fundamentally, while the same user repeatedly plays the same musical piece, the proficiency level of playing technique fluctuates, but it is assumed in the present embodiment that only when the proficiency level has been improved from the last performance of the musical piece, the obtained data is stored as a new record in the proficiency-level information database 14. In other words, in the group of the records having the user ID, "uid1" and the piece ID, "sid1", it is assumed that these records are arranged in ascending order of the proficiency-level, "sk1101", "sk1102", "sk1103", ..., "sk1108".

In the function recommending server 1, the controlling unit 12 receives the proficiency-level related information from an arbitrary electronic musical instrument and stores the received information in the proficiency-level information database 14, and then performs a support-function recommending process shown in FIG. 5 to FIG. 8.

The support-function recommending process is performed by the controlling unit 12 for providing the function recommending information to the electronic musical instrument 2 which has sent the proficiency-level related information to the controlling unit 2, wherein the function recommending information indicates the support function suitable for the user to acquire the playing technique when the user practices an arbitrary practice piece. As described above, the function recommending information supplied to the electronic musical instrument 2 in the present embodiment is information of indicating the recommendation order of the respective support functions determined based on expected effectiveness in acquiring the playing technique.

The support-function recommending process to be performed by the controlling unit 12 will be described in outline hereinafter. The user of the electronic musical instrument 2 uses an arbitrary sort of support function as needed, when practicing a practice piece. The user repeatedly practices the practice piece, improving his or her playing technique of the practice piece, and finally he or she reaches the level where he or she can play the practice piece smoothly.

In the support-function recommending process of the present embodiment, when the proficiency-level described above has reached 90% or more of the total number of notes contained in the practice piece, it is determined that the user has become good at playing the specific practice piece. More detailed description will be given with reference to the records shown in FIG. 4. For instance, in the case of a user of the user ID "uid1", if his or her proficiency level "sk1107" of a practice piece of the piece ID "sid1" had reached 90% or more of the total number of notes of the practice piece, it is determined that the user had become good at playing the practice piece at the date and time of "dt1107".

Now, it will be supposed that the user of the user ID "uid1" has used some support function to improve his or her playing technique of the practice piece, while his or her proficiency level advances from "sk1102" to "sk1107". From another point of view, when the sums of the respective functions (function 1 to function 4) in 6 records having the date and time falling a range from "dt1102" to "dt1107" are calculated, it will be determined that the function of the maximum sum was most frequently used by the user to improve his or her proficiency level from "sk1102" to "sk1107".

The sums of the respective functions 1 to 4 are calculated to obtain the respective sums F1 to F4.

The sum F1 of the function 1 is obtained as follows:

$$F1=(f1v1102+f1v1103+f1v1104+f1v1105+f1v1106+f1v1107)$$

The sum F2 of the function 2 is obtained as follows:

$$F2=(f2v1102+f2v1103+f2v1104+f2v1105+f2v1106+f2v1107)$$

The sum F3 of the function 3 is obtained as follows:

$$F3=(f3v1102+f3v1103+f3v1104+f3v1105+f3v1106+f3v1107)$$

The sum F4 of the function 4 is obtained as follows:

$$F4=(f4v1102+f4v1103+f4v1104+f4v1105+f4v1106+f4v1107)$$

Similarly, in the case of other user of the user ID "uid2", when he or she practiced the same practice piece as the user of the user ID "uid1" and advanced his or her proficiency level from "sk2104" to "sk2107", it will be determined that he or she used a specific function as will be described below. That is, the sums F1, F2, F3, and F4 of the respective functions (function 1 to function 4) in the 6 records of the date and time falling in a range from "dt2104" to "dt2107" are calculated, and it will be determined that the function of the maximum sum among F1, F2, F3, and F4 was most frequently used by the user to improve his or her proficiency level from "sk2104" to "sk2107".

In this case, these sums are obtained as follows:
The sum F1 of the function 1 is obtained as follows:

$$F1=(f1v2104+f1v2105+f1v2106+f1v2107)$$

The sum F2 of the function 2 is obtained as follows:

$$F2=(f2v2104+f2v2105+f2v2106+f2v2107)$$

The sum F3 of the function 3 is obtained as follows:

$$F3=(f3v2104+f3v2105+f3v2106+f3v2107)$$

The sum F4 of the function 4 is obtained as follows:

$$F4=(f4v2104+f4v2105+f4v2106+f4v2107)$$

Therefore, when the sums (F1 to F4) of the respective functions (function 1 to function 4) are calculated for each user and then these calculated sums (F1 to F4) of the respective functions (function 1 to function 4) are added for a number of users to obtain total sums of the respective functions (function 1 to function 4), it will be determined that the function of the maximum total sum was used by the number of users to improve their proficiency level from "sk1104" (or "sk2104") to "sk1107" (or "sk2107").

In this case, when it is assumed that the sum F1 of the function 1 for the user of the user ID "uid1" is expressed by Z11, and the sum F1 of the function 1 for the user of the user ID "uid2" is expressed by Z21, and so on, the total sum (F1) of the function 1 for a number of users (n users) will be given by $(Z11+Z21+Z31+\ldots+Zn1)$. Similarly, the total sum (F2) of the function 2 for a number of users (n users) will be obtained by $(Z12+Z22+Z32+\ldots+Zn2)$, the total sum (F3) of the function 3 for a number of users (n users) will be obtained by $(Z13+Z23+Z33+\ldots+Zn3)$, and the total sum (F4) of the function 4 for a number of users (n users) will be obtained by $(Z14+Z24+Z34+\ldots+Zn4)$.

If the support function is employed as the practice method, the practice method using the specific function is employed by a number of users who have become good at playing the practice piece, and is a so-called case of success.

In the case where the present proficiency level of an arbitrary user for a practice piece of the piece ID "sid1" is a value corresponding to the proficiency level "sk1102" (and "sk1202"), if the user uses the same practice method as the practice method that a number of users employed, it will be decided that he or she could well become good at playing the practice piece.

In other words, when the total sums F1 to F4 of the respective functions 1 to 4 used by a number of users are calculated, it will be decided that the larger the total sum (F1, F2, F3 or F4) of the function, the more effective for the user in acquiring the playing technique such function is.

Meanwhile, concerning to the practicing methods employed by a number of users who became good at playing a practice piece, the users selected the support functions to use according to their own tastes and likes, respectively, and such selection of the support function was reflected by each user's taste and like.

Therefore, in the support function recommending process in the present embodiment, the total sums (F1 to F4) of the respective functions (function 1 to function 4) used by a number of users who became good at playing the practice piece are not used as evaluation values but the following values are used as evaluation values for evaluating the respective functions (function 1 to function 4), respectively, each indicating an effectiveness of the function.

More specifically, similarities in practicing method between the users who became good at playing a specific practice piece and a user who is to be recommended a support function are used as weights, and weighted averages of the sums F1, F2, F3 and F4 of the respective functions (function 1 to function 4) are calculated. The weighted averages of the sums F1, F2, F3 and F4 of the respective functions (function 1 to function 4) are calculated and used as the evaluation values ("score" to be described later) each for indicating an effectiveness of each of the functions (function 1 to function 4). And the recommendation order of the respective support functions is determined on the basis of the evaluation values.

The similarities in practicing method between the users who became good at playing a specific practice piece and the user who is to be recommended a support function that is, the similarities in the practicing methods can be calculated in several calculating manners. For instance, a method of calculating the reciprocal of the sum of Euclidean distance and "1" or the reciprocal of the sum of Manhattan distance and "1", and a method of calculating Pearson's correlation coefficient and/or Tanimoto's coefficient as a degree of the relatedness are used as the method of calculating the above similarities. But as will be described, the method of calculating Pearson's correlation coefficient is used in the support function recommending process in the present embodiment.

The support function recommending process performed by the controlling unit 12 will be specifically described with reference to flow charts of FIG. 5 to FIG. 8.

In the support function recommending process of FIG. 5, the controlling unit 12 refers to the proficiency-level related information newly stored in the database 14 to confirm the user ID of a user and the piece ID, wherein the user (hereinafter, an "identical person") is to be recommended a support function suitable for improving a playing technique of a practice piece of the piece ID (step S1 in FIG. 5). In other words, the identical person is supplied with information of the support function to be recommended.

Figure 6:
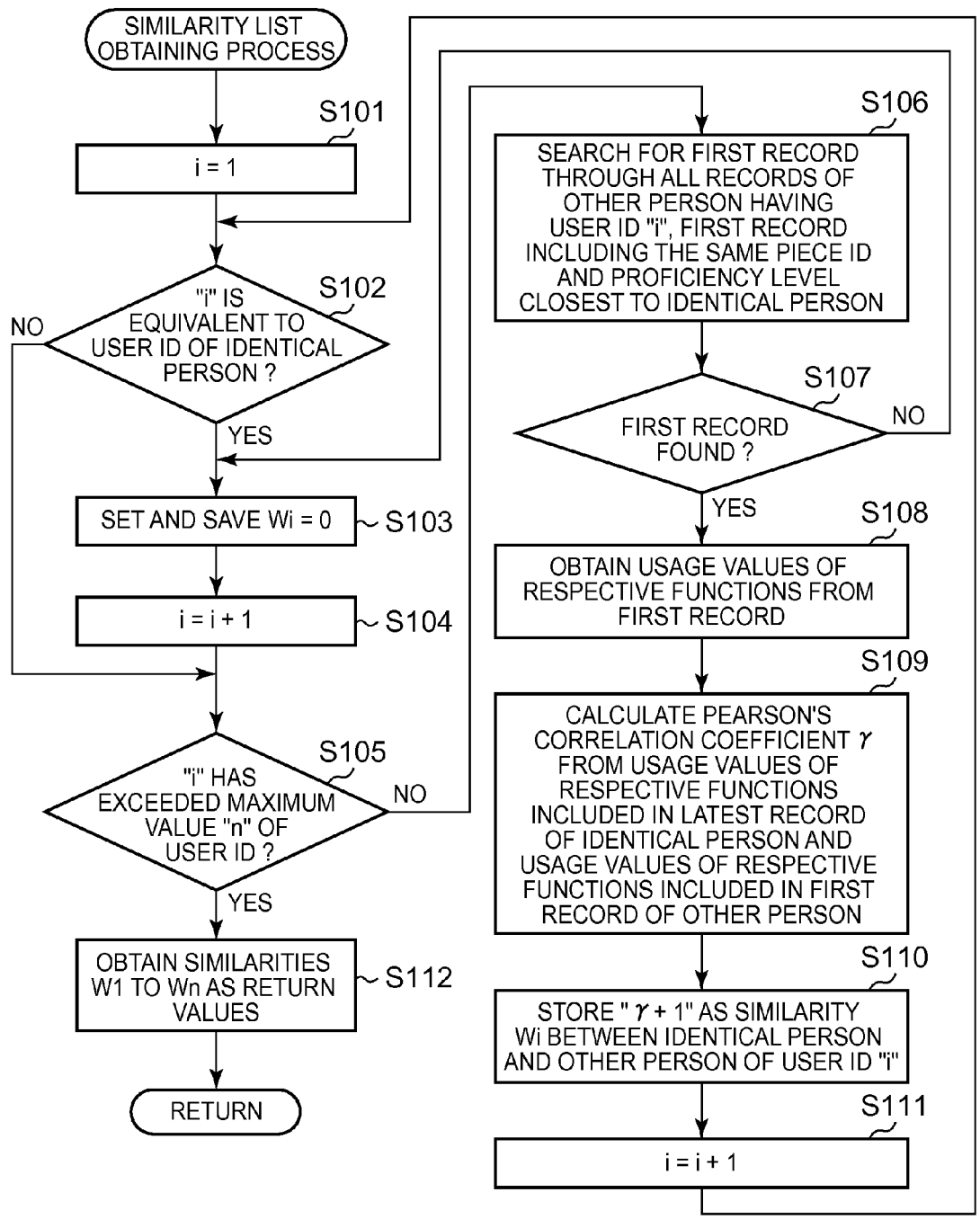
FIG. 6 is a flow chart of a similarity list obtaining process performed in the function recommending server.

The controlling unit 12 performs a similarity list obtaining process in accordance with a flow chart shown in FIG. 6 (step S2). The similarity list obtaining process is performed to obtain a similarity list (W1 to Wn) representing how much practicing methods used by users other than the identical person are similar to the identical person's method of practicing the practice piece of piece ID confirmed at step S1.

In the similarity list obtaining process of FIG. 6, the controlling unit 12 sets "1" to the user's number "i" representing the user (step S101). When it is determined that the user's number "i" is equivalent to the user ID of the identical person (YES at step S102), the controlling unit 12 sets a similarity Wi of the identical person to "0" and saves it (step S103), and then increments the user's number "i" (step S104). Thereafter, the controlling unit 12 repeatedly performs processes at step S106 to step S111 while it is determined that the user's number "i" has not exceeded the maximum value "n" (NO at step S105).

Meanwhile, when it is determined that the user's number "i" is not equivalent to the user ID of the identical person (NO at step S102), the controlling unit 12 repeatedly performs the processes at step S106 to step S111 while it is determined that the user's number "i" has not exceeded the maximum value "n" (NO at step S105).

The controlling unit 12 searches for a first record through all the records of other person having the user ID of the user's number "i" (hereinafter, the user ID "i") contained in a number of pieces of proficiency-level related information (FIG. 4) stored in the proficiency-level information database 14 (step S106), wherein the first record includes the same piece ID as the practice piece to be processed and a proficiency-level which is closest to and higher than that of the identical person.

When it is determined that the first record has not been found in the proficiency-level information database 14 (NO at step S107), the controlling unit 12 returns to step S103 to store the similarity Wi=0 of the above other person of the user ID "i".

Meanwhile, it is determined that the first record has been found in the proficiency-level information database 14 (YES at step S107), the controlling unit 12 obtains values of the respective functions (function 1 to function 4) from the first record, that is, usage values (used time or the number of used times) of the respective functions from the first record (step S108).

Then, using as parameters the usage values of the respective functions (function 1 to function 4) included in the latest record of the identical person or included in the proficiency-level related information newly stored in the proficiency-level information database 14 and the usage values of the respective functions (function 1 to function 4) included in the first record of the other person, the controlling unit 12 operates the following equation (1) to calculate Pearson's correlation coefficient Y (step S109).

$$Y = [\Sigma XY - \Sigma X \Sigma Y/N]/\{[\Sigma X^2 - (\Sigma X)^2/N][\Sigma Y^2 - (\Sigma Y)^2/N]\}^{1/2} \quad (1)$$

In the equation (1), X represents the usage values of the respective functions (function 1 to function 4) included in the latest record of the identical person, and Y represents the usage values of the respective functions (function 1 to function 4) included in the first record of the other person. N is the number of functions (function 1 to function 4), that is, 4.

The contents of the equation (1) will be specifically described with reference to the data shown in FIG. 4. For instance, in the case that the identical person has the user ID "uid9" and his or her latest record includes the proficiency-level (present proficiency-level) of "sk9103" for the practice piece of the piece ID "sid1" and the other person has the user ID "uid1" and his or her first record includes the proficiency-level of "sk1102", then, the contents of the equation (1) will be as follows:

That is, $\Sigma X$ is given by $(f1v9103+f2v9103+f3v9103+f4v9103)$, and $\Sigma XY$ is given by $(f1v9103 \times f1v1102+f2v9103 \times f2v1102+f3v9103 \times f3v1102+f4v9103 \times f4v1102)$. Further, $\Sigma x^2$ is given by $(f1v9103^2+f2v9103^2+f3v9103^2+f4v9103^2)$, and $\Sigma Y^2$ is given by $(f1v1102^2+f2v1102^2+f3v1102^2+f4v1102^2)$.

Further, for example, in the case that the other person has the user ID "uid2" and his or her first record includes the proficiency-level of "sk2104", the contents of the equation (1) will be as follows:

That is, $\Sigma x$ is given by $(f1v9103+f2v9103+f3v9103+f4v9103)$, and $\Sigma XY$ is given by $(f1v9103 \times f1v2104+f2v9103 \times f2v2104+f3v9103 \times f3v2104+f4v9103 \times f4v2104)$. Further, $\rho x^2$ is given by $(f1v9103^2+f2v9103^2+f3v9103^2+f4v9103^2)$, and $\Sigma Y^2$ is given by $(f1v2104^2+f2v2104^2+f3v2104^2+f4v2104^2)$.

Then, the controlling unit 12 adds 1 to Pearson's correlation coefficient Y calculated at step S109 to obtain a value of "Y+1", and stores the value of "Y+1" as the similarity Wi in the practicing method of the identical person to the other person of user ID "i" (step S110). The reason for that Pearson's correlation coefficient Y itself is not used but Pearson's correlation coefficient Y with 1 added is used, resides in that since Pearson's correlation coefficient Y calculated from the equation (1) is a real number falling in a range form −1 to +1 and can be a negative number, Pearson's correlation coefficient Y with 1 added is used in order to use the similarity Wi as a positive number for convenience in the following process.

Thereafter, the controlling unit 12 increments the user's number "i" to change other person (step S111), and returns to step S102 to repeatedly perform the processes at step S103 to step S111. When it is determined that the user's number "i" has exceeded the maximum value "n" (YES at step S105), the controlling unit 12 obtains the similarities W1 to Wn of the respective persons as return values (step S112), finishing the similarity list obtaining process and returning to the process of FIG. 5.

Figure 5:
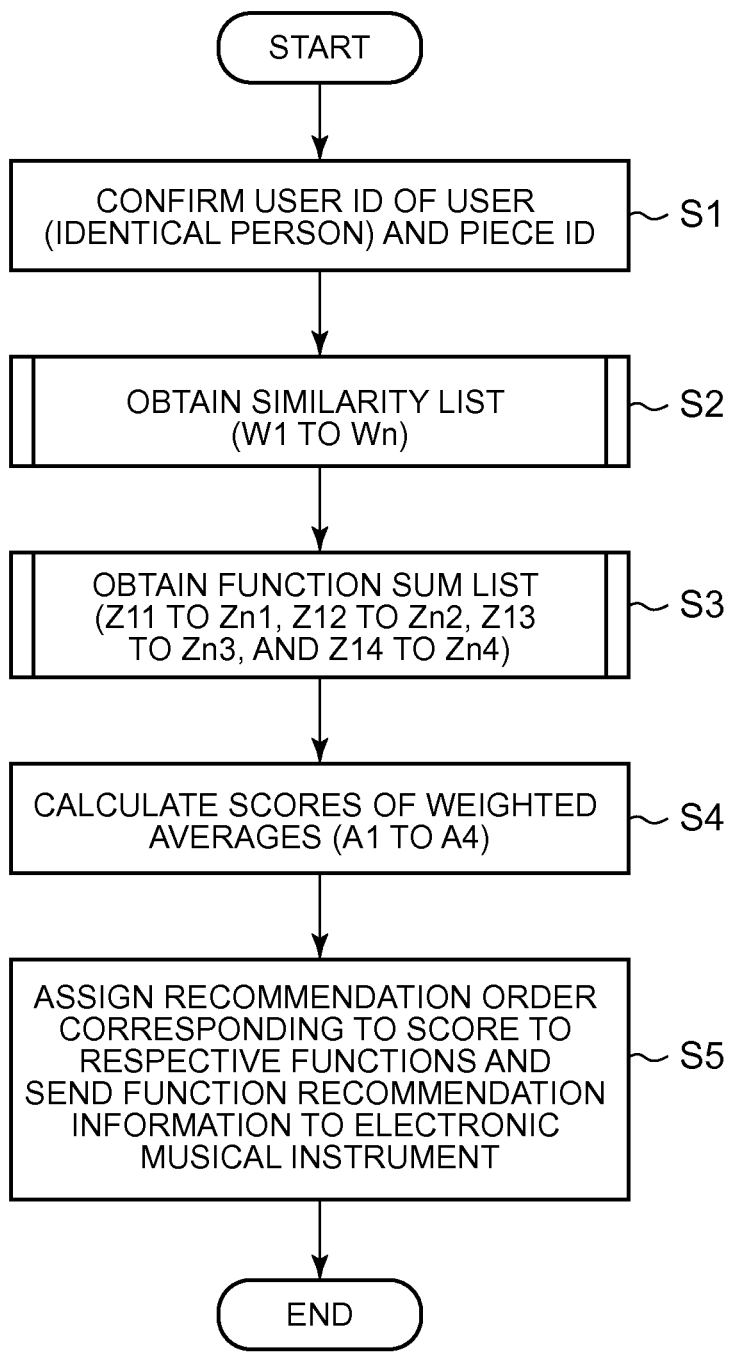
FIG. 5 is a flow chart of a support function recommending process performed in the function recommending server.

Further, the controlling unit 12 performs a function-sum list obtaining process (FIG. 7) (step S3 in FIG. 5). The function-sum list obtaining process is for obtaining a list (Z11 to Zn1, Z12 to Zn2, Z13 to Zn3, and Z14 to Zn4) of sums of usage amounts of the respective functions used by the users to improve their proficiency-level from the present level to their aimed level.

Figure 7:
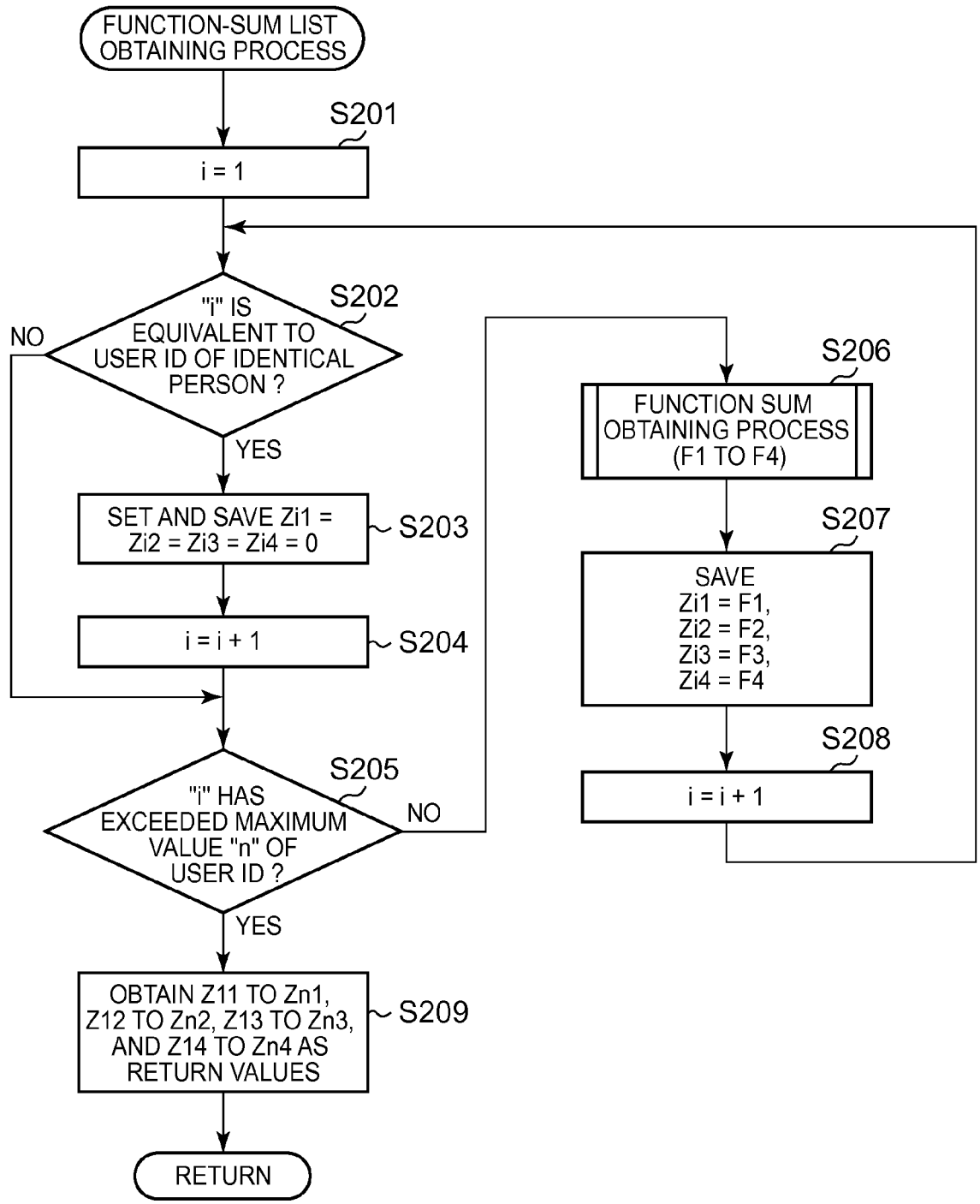
FIG. 7 is a flow chart of a function-sum list obtaining process performed in the function recommending server.

In the function-sum list obtaining process shown in FIG. 7, the controlling unit 12 sets 1 to the user's number "i" indicating the user (step S201). When it is determined that the user's number "i" is equivalent to the user ID of the identical person (YES at step S202), the controlling unit 12 sets all the sums (Zi1, Zi2, Zi3 and Zi4) of usage amounts (used hours or the number of used times) of the respective functions used by the identical person to "0" and saves them (step S203), and then increments the user's number "i" (step S204). Thereafter, the controlling unit 12 repeatedly performs processes at step S206 to step S208 while it is determined that the user's number "i" has not exceeded the maximum value "n" (NO at step S205).

When it is determined that the user's number "i" is not equivalent to the user ID of the identical person (NO at step S202), the controlling unit 12 repeatedly performs processes at step S206 to step S208 while it is determined that the user's number "i" has not exceeded the maximum value "n" (NO at step S205).

Figure 8:
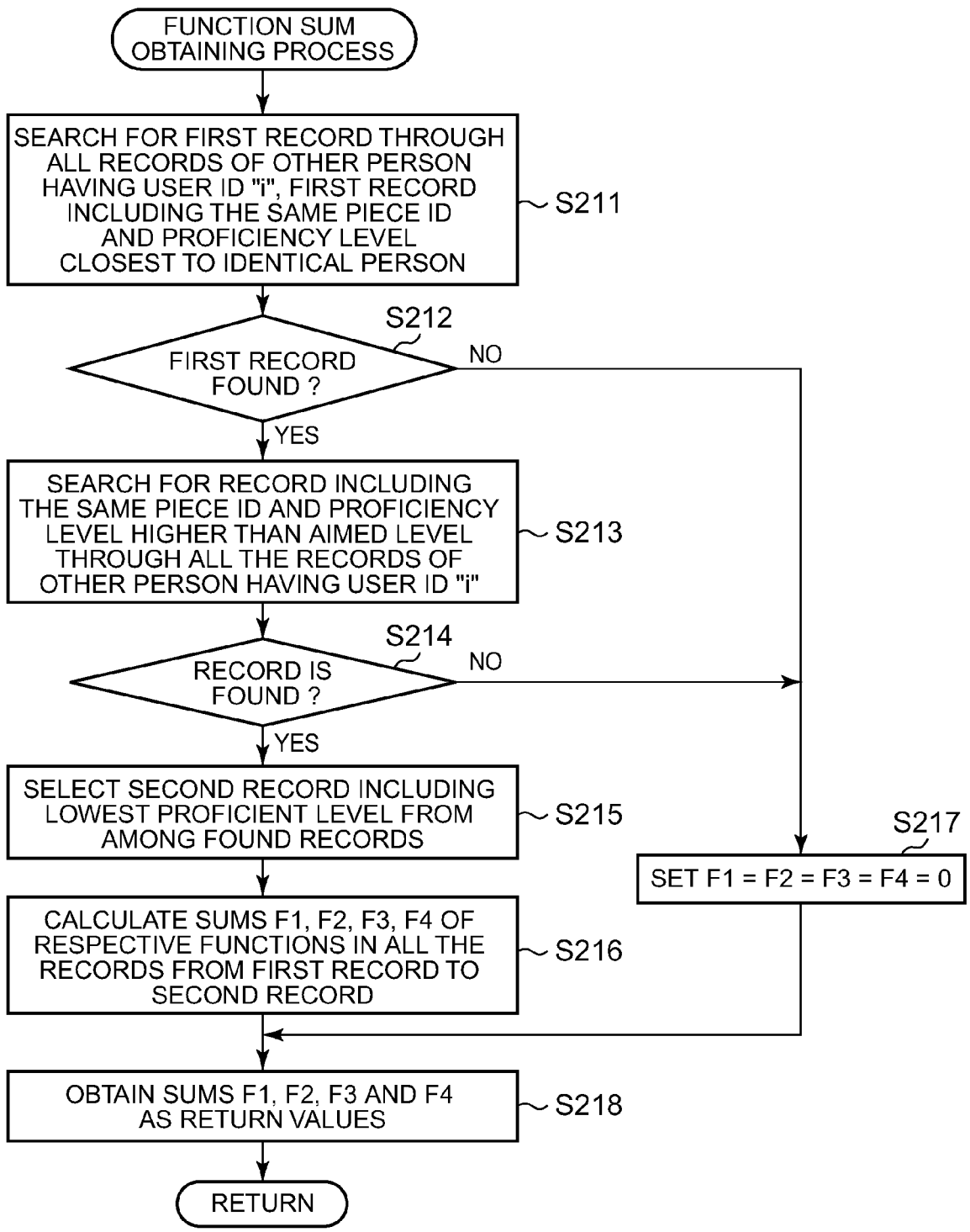
FIG. 8 is a flow chart of a function sum obtaining process performed in the function recommending server.

In a function sum obtaining process shown in FIG. 8, the controlling unit 12 obtains the sums F1, F2, F3 and F4 of usage amounts (used hours or the number of used times) of the respective functions used by a specific person having the user ID of the user's number "i" (step S206).

In the function sum obtaining process, the controlling unit 12 searches for a first record through all the records of other person having the user ID "i" contained in a number of pieces of proficiency-level related information (FIG. 4) stored in the proficiency-level information database 14 (step S211), wherein the first record includes the same piece ID as the practice piece to be processed and a proficiency-level which is closest to and higher than that of the identical person.

When it is determined that the first record has been found in the proficiency-level information database 14 (YES at step S212), the controlling unit 12 searches for the records including the same piece ID as the practice piece to be processed, and the proficiency-level equivalent to or higher than the aimed level through all the records of the other person having the user ID "i", wherein the aimed level of the proficiency-level is equivalent to 90% of the total number of notes included in the practice piece, as described above.

When it is determined that one or more records including the proficiency-level equivalent to or higher than the aimed level has been found in the proficiency-level information database 14 (YES at step S214), the controlling unit 12 selects as the second record the record including the lowest proficiency-level among the record(s) found at step S214 (step S215).

Thereafter, the controlling unit 12 calculates the sums F1 to F4 of the respective functions included in all the records between the first record and the second record, that is, included in all the plural records having the date and time falling in a range between the date and time of the first record and the date and time of the second record (step S216).

Meanwhile, when it is determined that the first record has not been found in the proficiency-level information database 14 (NO at step S212), or when it is determined that no record including the proficiency-level equivalent to or higher than the aimed level has been found in the proficiency-level information database 14 (NO at step S214), the controlling unit 12 sets the sums F1 to F4 of the respective functions included in the records of other person having the user ID "i" to "0" (step S217).

The controlling unit 12 obtains the sums F1 to F4 of the respective functions calculated at step S216 or the sums F1 to F4 of the respective functions determined at step S217 as the return values (step S218), finishing the function sum obtaining process and returning to the process of FIG. 7.

Thereafter, the controlling unit 12 saves the sums F1 to F4 of the respective functions obtained in the function sum obtaining process as a list (Z11 to Zn1, Z12 to Zn2, Z13 to Zn3, and Z14 to Zn4) of sums F1 to F4 of usage amounts of the respective functions used by respective users (step S207). And the controlling unit 12 increments the user's number "i" to change the person (step S208), and returns to step S202, repeatedly performing the processes at step S202 to step S208.

When it is determined that the user's number "i" has exceeded the maximum value "n" (YES at step S205), the controlling unit 12 obtains the sums Zi1, Zi2, Zi3 and Zi4 of the respective functions used by all the users as return values (step S209), finishing the function-sum list obtaining process and returning to the process of FIG. 5.

Further, the controlling unit 12 uses as parameters the similarities (W1 to Wn) of plural users obtained in the similarity list obtaining process (step S2 in FIG. 5, FIG. 6) and the sums (Z11 to Zn1, Z12 to Zn2, Z13 to Zn3, and Z14 to Zn4) of the respective functions used by all the users obtained in the function-sum list obtaining process (step S3 in FIG. 5, FIG. 7) to calculate the following formula (2), obtaining scores (A1 to A4).

$$Aj=(W_1Z_{1j}+W_2Z_{2j}+W_3Z_{3j}+\ldots+W_nZ_{nj})/(W_1+W_2+W_3+\ldots W_n) \quad (2)$$

where X represents the usage values of the respective functions in the latest record of the identical person, Y represents the usage values of the respective functions in the first record of other person, N represents the number of support functions (=4), "i" represents the user's number, "n" represents the maximum of user's number, and "j" represents the number of the support function.

The controlling unit 12 uses the similarities W1 to Wn of each user as weights to calculate the weighted averages of the sums of the respective functions, obtaining the calculation results as the scores each indicating a degree of effectiveness of each function (step S4 in FIG. 5).

Thereafter, the controlling unit 12 assigns the recommendation order to the respective functions depending on the obtained scores, that is, gives high ranked order to the function of a higher score, and sends back function recommendation information indicating the recommendation order of the respective functions to the electronic musical instrument 2 which had send the proficiency-level related information 301 (step S5). Further, upon receipt of the function recommendation information from the function recommending server 1 (the controlling unit 12), the electronic musical instrument 2 displays plural support functions together with the recommendation order on LCD of the displaying unit 26.

The user of the electronic musical instrument 2 is allowed to confirm the recommendation order of each support function on LCD of the displaying unit 26, and therefore the user can learn which support function he or she should use to acquire the playing technique of the practice piece without failure and in an effective manner. For instance, the user can learn he or she should use a new support function that he or she has not used before or the user can learn he or she should continue to use the same support function as that he or she has used before.

According to the embodiment of the invention described above, the electronic musical instrument 2 provided with plural support functions for assisting the user in acquiring the playing technique of a practice piece can give the user information of the support function that is appropriate for acquiring the playing technique of the practice piece prepared in advance, is effective to improve his or her present proficiency-level and meets his or her likes and tastes.

The electronic musical instrument 2 according to the present embodiment gives the user information of the support function which is not only effective to improve his or her present proficiency-level but also meets his or her like and taste. But the electronic musical instrument 2 can be modified to determine the recommendation order to be assigned to the support functions based on the sums of usage amounts of the respective functions used by a number of users who became good at playing the practice piece, and to give the user only the information of the support function that is effective to improve his or her present proficiency-level.

In the description of the present embodiment of the invention, the electronic musical instrument 2 has been described, which displays the recommendation order of the support functions that is determined based on the degrees of expected effectiveness of the respective support functions in acquiring the playing technique. But the electronic musical instrument 2 can be modified so as to indicate only a specific support function in place of the recommendation order to the plural support functions, wherein such specific support function is determined to be highest in expected effectiveness for acquiring the playing technique.

In the above description, the case has been described, in which the embodiment of invention is applied to the electronic musical instrument 2 such as the electronic piano and/or the electronic keyboard. The present invention can be applied to any electronic musical instrument other than keyboard instruments (including the electronic pianos and the electronic keyboards), as far as such electronic musical instrument is provided with plural support functions to be used for assisting the user in acquiring the playing technique.

Having described and illustrated the principles of the present application by reference to the preferred embodiments, it should be apparent that the preferred embodiments may be modified in arrangement and detail without departing from the principles disclosed herein and that it is intended that the application be construed as including all such modifications and variations insofar as they come within the sprit and scope of the subject matter disclosed herein.

What is claimed is:

1. A support function recommending apparatus comprising:
    a memory for storing plural pieces of proficiency level related information, the proficiency level related information including (i) usage amounts of plural support functions which are used by each of a number of users in performing a playing practice of a practice piece during a period from a previous practice to a last practice, and (ii) proficiency levels of a playing technique of the users in performing the practice piece;
    a searching unit for searching for a series of proficiency level related information of other users other than a given user, which include a proficiency level falling in a range from a first proficiency level to a second proficiency level, through the plural pieces of proficiency level related information stored in the memory, wherein the first proficiency level corresponds to a proficiency level of the given user in latest proficiency level related information of the given user, and the second proficiency level corresponds to an aimed proficiency level of the playing practice by the given user;
    a judging unit for determining an effectiveness of each of the plural support functions based on the series of proficiency level related information found by the searching unit; and
    a function recommending unit for providing the given user with function recommending information indicating the support function which is determined by the judging unit to be most effective and suitable for performing the playing practice of the practice piece.

2. The support function recommending apparatus according to claim 1, wherein the judging unit comprises a function sum obtaining unit for adding usage amounts of the respective support functions included in the series of proficiency level related information found by the searching unit to obtain sums of the respective support functions, and determines the effectiveness of each support function based on the sums of the respective support functions obtained by the function sum obtaining unit.

3. The support function recommending apparatus according to claim 2, further comprising:
    a similarity obtaining unit for obtaining similarities of the users, based on the usage amounts of the respective support functions, between (i) specific proficiency level related information which is the proficiency level related information of the other users that includes the first proficiency level, and (ii) the latest proficiency level related information of the given user, wherein the specific proficiency level related information corresponds to the proficiency level related information including the second proficiency level, among the proficiency level related information of the other users, stored in the memory; and
    an evaluation value obtaining unit for obtaining evaluation values of the respective support functions by adding the similarities of the users obtained by the similarity obtaining unit to the sums of the respective support functions obtained by the function sum obtaining unit,
    wherein the judging unit determines the effectiveness of the respective support functions based on the evaluation values of the respective support functions obtained by the evaluation value obtaining unit.

4. The support function recommending apparatus according to claim 2, further comprising:
    a similarity obtaining unit for obtaining similarities of the given user to the other users, based on the usage amounts of the respective support functions, by comparing (i) specific proficiency level related information which is the proficiency level related information of the other users that includes the first proficiency level and (ii) the latest proficiency level related information of the given user; and
    an evaluation value obtaining unit for obtaining evaluation values of the respective support functions by adding the similarities of the users obtained by the similarity obtaining unit to the sums of the respective support functions obtained by the function sum obtaining unit,
    wherein the judging unit determines the effectiveness of the respective support functions based on the evaluation values of the respective support functions obtained by the evaluation value obtaining unit.

5. A support function recommending system comprising:
    a support function recommending apparatus according to claim 1; and
    a plurality of electronic musical instruments which are provided with plural support functions for assisting a user in acquiring a playing technique,
    wherein each of the plural electronic musical instruments comprises:
    an information obtaining unit for obtaining proficiency level related information of a user, including usage amounts of respective support functions which are used by the user in performing a playing practice of a practice piece during a period from a previous practice to a last practice and a proficiency level of a playing technique of the user in performing the playing practice of the practice piece; and
    a supplying unit for supplying the support function recommending apparatus with the proficiency level related information obtained by the information obtaining unit.

6. A support-function recommending method for a support function recommending apparatus that includes a memory for storing plural pieces of proficiency level related information, the proficiency level related information including (i) usage amounts of plural support functions which are used by each of a number of users in performing a playing practice of a practice piece during a period from a previous practice to a last practice, and (ii) proficiency levels of a playing technique of the users in performing the practice piece, a searching unit, a judging unit, and a function recommending unit, the method comprising:

searching, by the searching unit, for a series of proficiency level related information of other users other than a given user, which include a proficiency level falling in a range from a first proficiency level to a second proficiency level, through the plural pieces of proficiency level related information stored in the memory, wherein the first proficiency level corresponds to a proficiency level of the given user in latest proficiency level related information of the given user, and the second proficiency level corresponds to an aimed proficiency level of the playing practice by the given user;

determining, by the judging unit, an effectiveness of each of the plural support functions based on the series of proficiency level related information found by the searching; and providing, by the function recommending unit, the given user with function recommending information indicating the support function which is determined by the to be most effective and suitable for performing the playing practice of the practice piece.

7. A non-transitory computer readable recording medium having recorded thereon a computer program that is executable by a computer of a support function recommending apparatus, wherein the support function recommending apparatus includes a memory for storing plural pieces of proficiency level related information, the proficiency level related information including (i) usage amounts of plural support functions which are used by each of a number of users in performing a playing practice of a practice piece during a period from a previous practice to a last practice, and (ii) proficiency levels of a playing technique of the users in performing the practice piece, and wherein the computer program is executable to cause the computer to perform a process comprising:

searching for a series of proficiency level related information of other users other than a given user, which include a proficiency level falling in a range from a first proficiency level to a second proficiency level, through the plural pieces of proficiency level related information stored in the memory, wherein the first proficiency level corresponds to a proficiency level of the given user in latest proficiency level related information of the given user, and the second proficiency level corresponds to an aimed proficiency level of the playing practice by the given user;

determining an effectiveness of each of the plural support functions based on the series of proficiency level related information found by the searching; and providing the identical user with function recommending information indicating the support function which is determined by the determining to be most effective and suitable for performing the playing practice of the practice piece.

\* \* \* \* \*